United States Patent [19]

Delhaes

[11] 4,445,257
[45] May 1, 1984

[54] CONVEYOR SHAFT PROVIDED WITH RUBBER ROLLERS, AND METHOD AND APPARATUS FOR MAKING SAME

[75] Inventor: Johannes C. Delhaes, Voerendaal, Netherlands

[73] Assignee: Rubber-en Kunststoffabriek ENBI B.V., Netherlands

[21] Appl. No.: 227,186

[22] Filed: Jan. 22, 1981

[30] Foreign Application Priority Data

Aug. 29, 1980 [NL] Netherlands ......................... 8004930
Jan. 5, 1981 [NL] Netherlands ......................... 8100005

[51] Int. Cl.³ ............................................. B65G 39/04
[52] U.S. Cl. ....................................... 29/117; 29/129; 193/37; 198/780; 403/221; 403/372
[58] Field of Search ............... 193/35 R, 37; 198/780, 198/843; 271/264, 272–275; 226/191, 192, 194; 29/117, 126, 129; 403/221, 371, 372

[56] References Cited

U.S. PATENT DOCUMENTS

| | | | |
|---|---|---|---|
| 1,803,357 | 5/1931 | Robins | 193/37 |
| 2,471,140 | 5/1949 | Breth | 193/37 X |
| 2,736,205 | 2/1956 | Dunne | 193/37 X |
| 3,219,176 | 11/1965 | Kindig | 198/843 |
| 3,305,075 | 2/1967 | Johnson | 193/35 R |

*Primary Examiner*—Jeffrey V. Nase
*Attorney, Agent, or Firm*—Scully, Scott, Murphy & Presser

[57] ABSTRACT

A shaft with rubber rollers designed to be made in a simple and inexpensive manner. The rollers are made separately with a helical spring or split clamping sleeve vulcanized in them during manufacture. The required number of rollers are ground to size and placed in an assembly block in the required spaced and axially aligned relationship, and the shaft is forced through the central apertures of the rollers.

3 Claims, 10 Drawing Figures

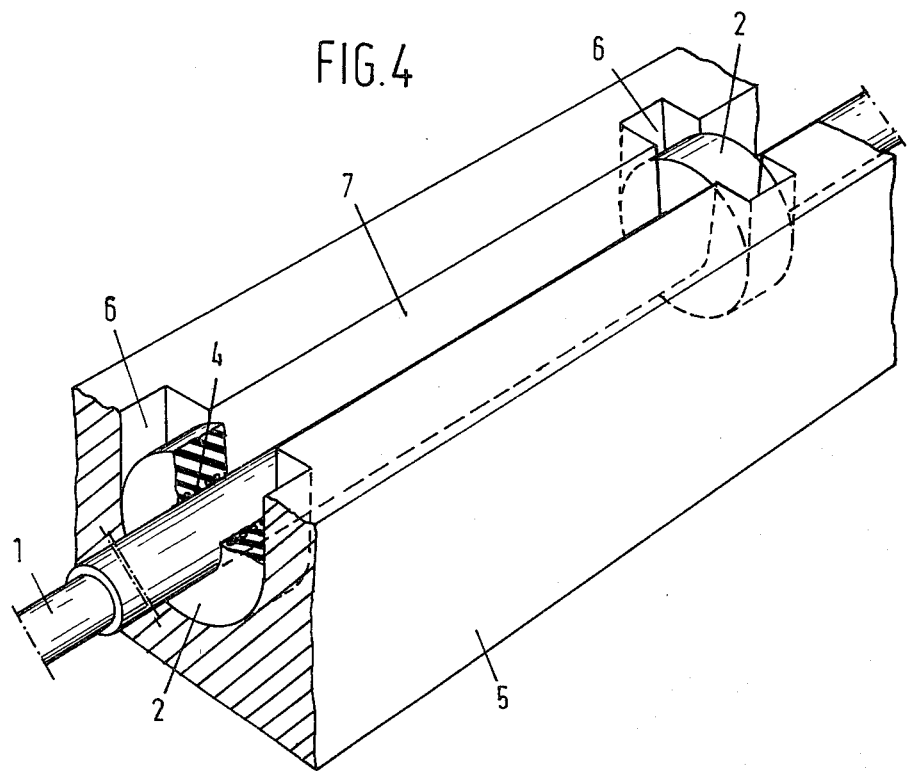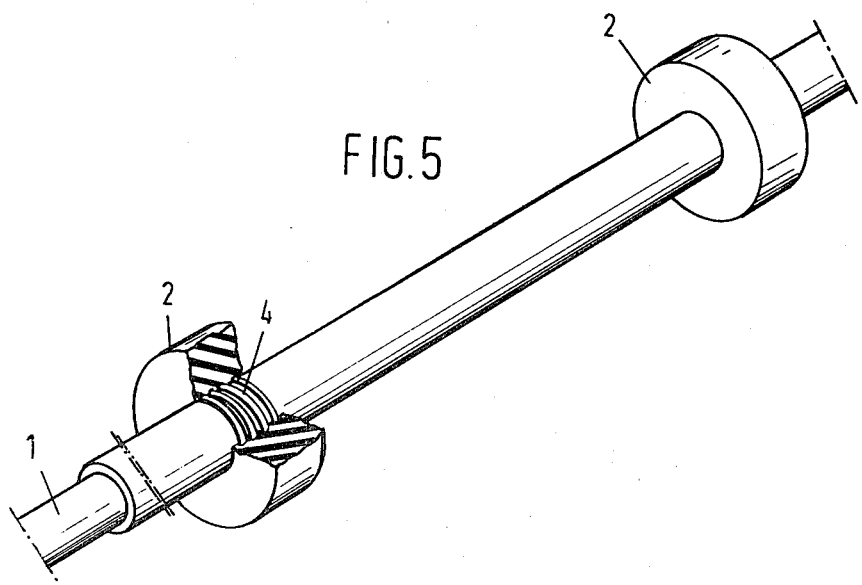

CONVEYOR SHAFT PROVIDED WITH RUBBER ROLLERS, AND METHOD AND APPARATUS FOR MAKING SAME

BACKGROUND OF THE INVENTION

This invention relates to a conveyor shaft provided with rubber rollers, and a method and apparatus for the manufacture thereof.

Such conveyor shafts are frequently used in the textile and paper making industry, and also for the handling of sheets of paper in printer's machines and copiers. The rollers should be so mounted on the shafts as to be capable of transmitting a prescribed circumferential force to an article to be transported without slipping on the shaft. In copiers, the minimum torque to be transmitted per roller is 3 Nm. By rubber as used in the present specification and claims is to be understood any elastomeric material.

For the manufacture of the shafts referred to above, various methods are known.

According to a first prior method, elastomeric rollers are secured to separate sleeves by means of adhesive or otherwise. The sleeves have a tapped hole therein, and a sleeve provided with a roller is fixed to the shaft by means of a screw. The sleeves used should be accurately machined. This method of manufacture is a highly laborious one and hence expensive.

In a second method, sleeves provided with an elastomeric roller are slipped on to a shaft, whereafter the shaft is knurled at the places where the rollers should ultimately be positioned. After the knurling, the rollers are laterally shifted and clamped on the knurled areas. The knurling of the conveyor shaft requires special machinery. This method is only feasible from an economic point of view in the case of large batches. Even so there is the drawback that it is necessary for the rollers, which are produced separately, to be first temporarily fixed on the shaft in a position next to their ultimate, knurled place of attachment.

In order to avoid the use of a special knurling machine, according to a third known method, the rubber rollers are vulcanized direct on the conveyor shaft. The shafts are placed in a mould, in which they serve as a core. The cylindrical chambers around the core are filled with liquid rubber or a like elastomeric material, which is subsequently vulcanized at a suitable temperature. To promote good adherence of the rubber to the shaft, the latter is previously degreased, and at the places where the rubber is to adhere to it, roughened and covered with a layer of adhesive. After the vulcanization of the rubber, the shaft is taken from the mould, any rubber leaked along the shaft is removed, and the rollers are ground and the shaft nickel-plates and, if necessary, straightened.

It is true that, in this way, a firm connection between the rubber roller and the conveyor shaft is produced, but every shaft requires a different mould, which must have a rubber supply channel for every roller. These supply channels are therefore necessarily of some length, and this in turn requires a relatively large excess of rubber. Furthermore, the shafts can only be made of materials resistant to the vulcanization temperature prevailing in the mould, which ranges from about 160° to about 190° C.

SUMMARY OF THE INVENTION

It is an object of the present invention to provide conveyor shafts of the type referred to and which can be made in a much simpler and less expensive manner, in the main by virtue of the fact that a large number of pretreatments and after-treatments can be omitted, with minimum consumption of rubber and while maintaining a strong roller-to-shaft connection.

The conveyor shaft according to the invention is characterized, to that effect, in the provision of a resilient element vulcanized in the rollers, by means of which the rollers are clamped on the shaft.

Preferably this resilient element is an axially split clamping sleeve vulcanized in the roller. These clamping sleeves are inexpensive and have the great advantages that the shaft for use with them may have a large tolerance without the torque to be supplied by the roller to be clamped on the shaft becoming less than the required minimum value.

As an alternative to a clamping sleeve it is possible to use a helical spring for the resilient element. It has surprisingly been found that when the spring is rotated relatively to the shaft ever so slightly, the spring is clamped more firmly on the shaft, so that further rotation becomes impossible. It is known to couple shafts together by means of a helical spring slipped on the facing ends thereof (U.S. Pat. No. 2,242,379), the shafts being coupled or uncoupled depending on the direction of rotation. When a helical spring is slipped fully on to the shaft it will be wound on the shaft more and more tightly when rotated relatively to the shaft, irrespective of the direction of rotation.

With a conveyor shaft according to the present invention, the rollers with a resilient element vulcanized in them can be made independently of the shafts proper. For this purpose they are formed in a mould in which they are spaced short distances from each other, resulting in a minimum volume of the rubber supply channel. One half-mould is provided with pins for forming the central opening in the rollers. These pins also serve for centering the resilient elements to be vulcanized in the rollers. After the vulcanization of the rubber the rollers are removed from the mould, and slipped on to an auxiliary shaft of the correct diameter, whereafter they are jointly ground to the desired diameter.

The rollers are mounted on the shaft by fixing them in a mounting block in axial alignment with each other, whereafter the shaft is forced through the central apertures of the rollers.

The shaft can be nickel-plated beforehand and need not be subject to any special pre-treatment for adhering the rollers to it, the desired clamping effect being now produced by means of the resilient elements. As the shaft is not subjected to the vulcanization temperature, there is more freedom in choice of materials to be used for making it. Thus, for example, it is possible to use synthetic plastics materials, whose use is precluded in prior constructions owing to their behaviour and properties at elevated temperatures. Also, the shaft cannot become warped or otherwise damaged as a result of the high mould temperature.

Owing to the separate manufacture of shafts and rollers, the possibility of combining different shafts and rollers is amplified. Thus, for example, on the one hand certain rollers can be used with shafts of different lengths, and on the other hand there is freedom in the choice of place and diameter of the rollers on a given shaft. As a result it is possible to rapidly make a prototype to investigate what number and what diameter of the rollers are the most favorable for a given machine and what elastomeric material is the most suitable for a given use. With the prior construction it was necessary to make a separate mould for every prototype.

BRIEF DESCRIPTION OF THE DRAWINGS

Some embodiments of the invention will now be described, by way of example, with reference to the accompanying drawings, in which

FIG. 4 is a part-sectional elevational view of the apparatus after the introduction of the shaft;

FIG. 5 is a perspective view of a shaft provided with rollers, with one of the rollers being shown partly in section;

DETAILED DESCRIPTION OF THE DRAWINGS

Figure 1:
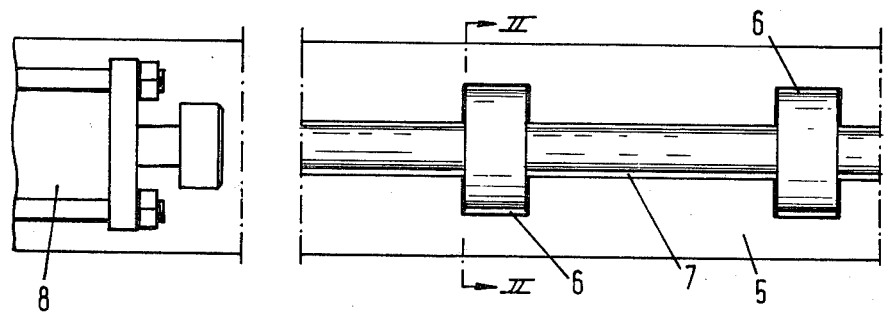
FIG. 1 illustrates a plan view of an apparatus for mounting rollers on a shaft.
Figure 3:
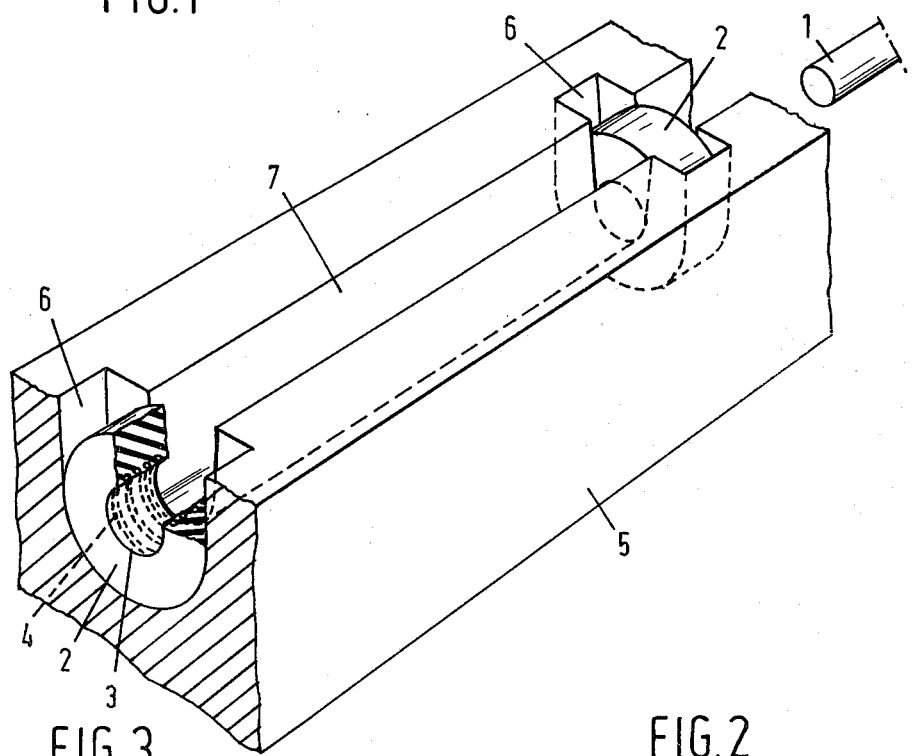
FIG. 3 is a perspective view, partly in cross-section, of the apparatus before the introduction of the shaft.
Figure 2:
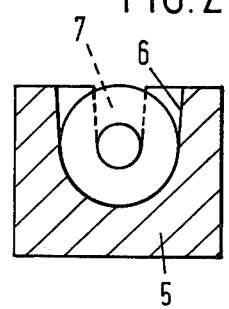
FIG. 2 is a cross-sectional view on the line II—II of FIG. 1.
Figure 6:
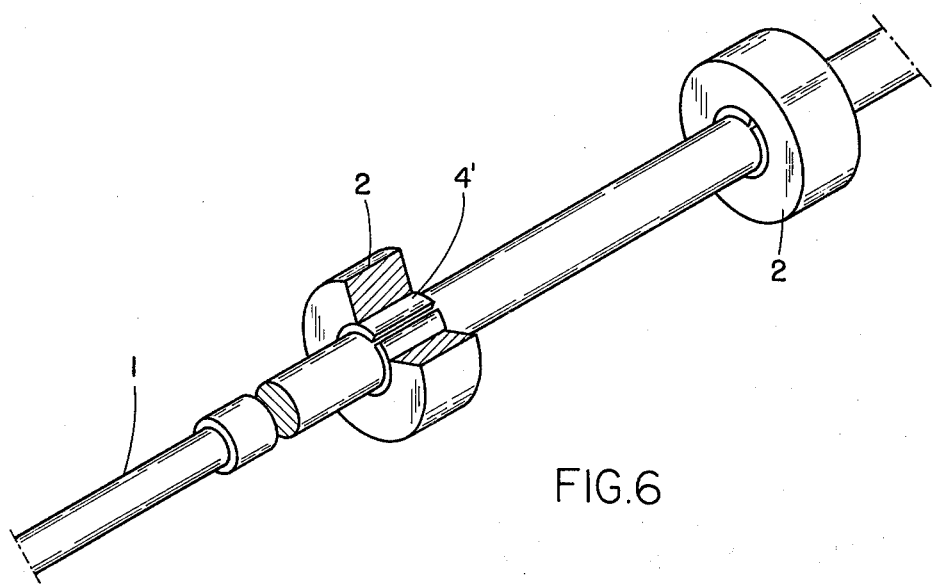
FIG. 6 is a part-sectional view similar to FIG. 5, but showing a clamping sleeve being used instead of a spring as the resilient element.
Figure 7A:
FIG. 7a–d show a series of clamping sleeves of different designs.
Figure 7B:
Figure 7C:
Figure 7D:

On a shaft 1, rubber rollers 2 are mounted, which have a central aperture 3 and a resilient element, vulcanized in them, in this case a helical spring 4, the inner diameter of which is approximately equal to the outer diameter of shaft 1. When a helical spring 4 is used, its inner diameter may be larger than the diameter of shaft 1, so that a rubber layer is formed between the windings and the shaft. This, however, reduces the torque to be transmitted by the roller. When clamping sleeves are used, their inner diameter is of course always less than the diameter of the shaft. FIG. 7 shows a number of clamping sleeves split in several ways in at least substantially axial direction. The clamping sleeves are made of spring steel. With a shaft of 10 mm diameter, and a clamping sleeve with a minus tolerance of −0.4 mm it is possible to transmit a torque of 7 Nm without the clamping sleeve beginning to slip on the shaft. Rollers 2 have been made by casting and vulcanizing rubber or a like elastomeric material in a mould. In this mould, a plurality of rollers can be made at a time. The pins for forming the central aperture in the rollers are provided in one half-mould in a position perpendicular to the joint face of the half-moulds. The resilient elements 4 to be vulcanized in the rollers 2 are centered by these pins. Before being introduced into the mould, springs 4 may be provided with an adhesive, e.g. by being dipped into an adhesive bath to improve the anchoring of the spring in the rubber.

When the vulcanized rollers 2 have been taken from the mould, they are slipped on to an auxiliary shaft and ground to the desired diameter, whereafter the auxiliary shaft is removed. Rollers 2 are next placed in a chamber 6 in an assembly block 5, which chambers are interconnected by a channel 7. The axes of rollers 2 are in alignment with each other. Thereafter shaft 1 is forced through the apertures 3 in rollers 2 by means of pneumatic cylinder 8. The distance through which the shaft is displaced can be regulated by means of a stop which limits the stroke of the cylinder.

After the assembly of the rollers, in most cases any further treatment of shaft 1 and/or rollers 2 will not be necessary, as such treatment can be effected beforehand owing to the separate manufacture of shaft and rollers. Only in case excessive truth is required will rollers 2 mounted on shaft 1 be required to be subjected to one last precision grinding operation.

The number and the position of the rollers 2 on shaft 1 can be varied to suit requirements by using an assembly block 5 having a large number of chambers 6, which can be filled with rollers as required. Block 5 may, alternatively, be fitted with a single elongated chamber 6, in which inserts and distance pieces are placed, the inserts containing rollers having the desired diameter and the distance pieces keeping these rollers at the required distance from each other.

It is also possible for the assembly device to be disposed in a vertical position, in which case rollers 2 must be laterally confined in all directions. Furthermore, the apparatus may be operated hydraulically or mechanically for the introduction of shaft 1.

I claim:

1. A driven shaft provided with rubber rollers driven along therewith, characterized in that each rubber roller is constructed as one unitary and integral component having a radially springing element vulcanized therein, by means of which the rollers are clamped on the shaft, said radially springing element being an axially split clamping sleeve.

2. A driven conveyor shaft provided with rubber rollers driven along therewith, characterized in that each rubber roller is constructed as one unitary and integral component having a radially springing element vulcanized therein, by means of which the rollers are clamped on the shaft, said radially springing element being a helical spring.

3. A shaft as claimed in claim 2, wherein the inner diameter of the helical spring is equal to, or slightly in excess of, the diameter of the central aperture of the rollers.

* * * * *